2,791,496
METHOD OF IMPREGNATING EXFOLIATED VERMICULITE

Ralph W. Rice, Encampment, Wyo.

No Drawing. Application August 31, 1953, Serial No. 377,726

8 Claims. (Cl. 71—3)

This invention relates to a vermiculite product and more particularly one for use in soil, or for use in lieu of soil itself, to improve the growth of a plant, and to a method of producing such product. The product of this invention may be used not only to enhance plant growth by conditioning the soil, but also can be used to add nutritional elements or soil organic conditioning substances to the soil. The product of my method can also be one to treat a plant for pest control by using it to place insecticides or chemicals into the plant through the soil or into the soil around the plant for treating soil living worms. In addition, with proper nutritional elements, a plant may be grown directly in the product of this invention.

The use of a fertilizer to add minerals and the like to soil, to supply necessary or desirable nutritional elements which may be either lacking in the soil or which have been lost or extracted by continued use of the soil for plant growth, is as old as the use of manure as a fertilizer. While the organic fertilizers, such as manure and guano are organic in general nature, the elements contained therein of principal plant nutritional value are generally inorganic elements and potassium, phosphorous and nitrogen appear to be the principal plant nutritional elements contained in the organic fertilizers. Thus, in more modern times, after more exact knowledge of the elements necessary or desirable to sustain plant growth had been obtained, other and principally inorganic sources of nutritional elements for plant growth have been utilized. The principal inorganic fertilizers are those known generally as potash, phosphate and nitrogen fertilizers, which have been used alone and in various combinations, usually being mixed with the soil in varying amounts in accordance with the needs of a particular soil and the crop or crops to be grown thereon. Such inorganic fertilizers normally contain other constituents, in amounts varying from small traces to small percentages, such additional elements including compounds of manganese, boron, aluminum, barium and others, as well as zinc sulphate, copper sulphate and the like. In the fertilizers which contain the plant nutritional elements, these elements are not contained as such but are contained as compounds. Thus, a potash fertilizer may consist generally of one or more potassium salts mixed with a filler to give a desired potash content, generally specified on the basis of $K_2O$. Such salts may be a chloride salt, such as $KCl$, or other salts such as $K_2SO_4$, $KNO_3$, $MgSO_4.K_2SO_4.6H_2O$, or the like. The inorganic phosphate fertilizers may be derived principally from so-called "phosphate rock," or $Ca_3(PO_4)_2$, which after a suitable acid treatment produces a so-called "super phosphate" or $CaH_4(PO_4)_2.H_2O$. The inorganic nitrogen fertilizers may include compounds such as $CaCN_2$, $NaNO_3$, $(NH_4)_2SO_4$, and other similar compounds containing nitrogen. The nitrogen, phosphate and potash fertilizers may be combined in a single mixture, which ordinarily but not necessarily contains a greater proportion of phosphate than the others. Of course, such mixtures also contain various other elements and compounds, as indicated previously. The inorganic fertilizers are usually produced in the form of water soluble compositions, since there appears to be an action of the moisture in the soil necessary to carry adequate nutritional elements to the plant roots, as well as their being reached by the roots through the soil.

Other factors affect plant growth, in addition to sunshine, air and nutritional elements in the soil, and one of these factors is the condition of the soil. A hard, closely packed soil not only resists the penetration of plant roots, but also impedes the passage of water, carrying nutritional elements or other substances through the soil. Thus, it has been found that a loosely packed soil is more favorable to plant growth than a hard packed soil, and a number of products have been developed which tend to maintain the soil in a more loose or friable condition. These products, which are apparently not nutritional elements per se, may be termed "adjuvants" to plant growth, and will be so referred to herein. One of these adjuvants is exfoliated vermiculite, the use of which is disclosed and claimed in my United States Patent No. 2,240,859. Vermiculite is a micaceous material which has a grayish color, a talc-like luster, a hardness of approximately 1.5 (i. e. between talc and gypsum), and a specific gravity of approximately 2.7. In addition, when cut with a knife or the like, the streak is uncolored. It occurs in numerous natural deposits, and appears to have the chemical formula $3MgO.(Fe,Al)_2O_3.3SiO_2$. One of the unusual properties of vermiculite is that upon heating to from 800 degrees F. to 2000 degrees F., it exfoliates or forms worm-like threads, due to a considerable expansion thereof. Thus, as compared with a weight of about 70 to 90 lbs. per cubic foot in the natural state, after exfoliation it may weigh only about 3 to 40 lbs. per cubic foot. The worm-like threads may also be ground or otherwise treated to produce small granules. For instance, vermiculite derived from beds near Encampment, Wyoming, and exfoliated by heating to 2000 degrees F., may be ground to produce granules of approximately 2 mesh to 4 mesh screen size weighing between 15 to 30 lbs. per cubic foot. As set forth in my United States Letters Patent No. 2,240,859, a range of screen sizes may be utilized, such as those retained on a 30 mesh screen and passing a one-half inch screen, to mix with the soil to maintain it in a loose and friable condition.

The exfoliated vermiculite granules are, of course, excellent for use as a soil conditioner, but apparently do not add detectable nutritional values to the soil or other desirable substances such as organic soil conditioners, pest control substances, etc. Due to the considerable difference in specific gravity between the common fertilizers and the exfoliated vermiculite granules, it is difficult if not impossible successfully to mix, by co-mingling, the fertilizer with the vermiculite granules. The result will be that during shipping, handling and storage, the vermiculite granules and fertilizer become separated and additional mixing prior to use will be required. Furthermore, despite thorough mixing of the fertilizer and vermiculite granules, there is still a non-uniformity in the distribution of the fertilizer through the vermiculite, in view of the comparatively small amount of fertilizer which is added to the vermiculite. While the vermiculite and the fertilizer could be each added to the soil independently, this is considerably more costly, involving two distinct operations. It will be evident, therefore, that a soil conditioner which also includes or contains plant nutritional elements, with the latter distributed uniformly and in controlled amount throughout the vermiculite granules, would be quite advantageous. Thus, it is an object of the present invention to provide a new vermiculite product which cannot only embody a fertilizer material, but any other desirable material to aid in growth of strong and healthy plants, and also to provide a novel method of producing the same. Among other objects of this invention are to provide such a product which may be handled readily, as by being shipped in sufficient dry condition that containers therefor do not tend to be wetted during transit; to provide such a product which will contain fertilizer elements or other desired substances in sufficiently tenacious relationship that they will not be lost, until actually absorbed during or for use in providing nutrients or other substances for healthy plant growth; to provide such a product which may be mixed readily with the soil to condition the same, or in which the proportions of fertilizer elements may be such that seeds may be planted directly therein; to provide a method of producing such a product by which the relative amounts of fertilizer elements or soil conditioner substances or other substances may be controlled readily; and to provide such a method which may be carried out easily and without undue cost. Additional objects and the novel features of this invention will become apparent from the description which follows.

In accordance with the present invention, the novel vermiculite product is produced by first obtaining a tough, dense exfoliated vermiculite, free of foreign matter and provided with minute cells or voids. I obtain this by a special process, after which the vermiculite is ground to a desired particle size, preferably —4 to +20 mesh in size; next dissolving in water a plurality of water-soluble nutritional plant elements and/or any other substances that are desired to be carried by the vermiculite; and then embodying in the cells of the vermiculite granules the substances in this aqueous solution. The water soluble nutritional soil elements may be inorganic products, such as the nitrogen, phosphate and potash fertilizers described previously, or may be any other inorganic or organic fertilizer which is soluble in water, and thereby may be transferred to the cells or voids of the vermiculite granules. Also, other water soluble products including soil conditioner substance may be added to the vermiculite granules, such as, for example, the recently discovered organic soil conditioning substance consisting essentially of hydrolized polyacrylonitrile sold under the trade name "Krilium" or the modified vinyl acetate-maleic acid compounds sold under the trade name "Merloam." Still further, the vermiculite may be a carrier for many other substances that are found to be beneficial to plants, such as certain insecticides that can be taken into the plant through its roots without harm to the general health of the plant and yet be beneficial in control of pests and disease, or insecticides or chemicals that can merely go into the soil to kill pests such as soil living worms. All of these substances may be combined or placed in the vermiculite separately to provide any number of useful vermiculite products.

To obtain the desired vermiculite for my new product, vermiculite crude ore, after being mined and ground, is watered to considerably increase its moisture content. This ore is then dropped through an oven and subjected to a high heat which will be in the neighborhood of 2000 degrees F. at the bottom of the oven. The exfoliating is caused to take place in a very short time, being in the oven around 16 seconds only. The resulting exfoliated product has very tough fibers or threads and there are minute cells provided which cause the vermiculite to be very dense for this particular substance. The weight of the vermiculite so produced will be from 15 to 30 lbs. per cubic foot. This is important and is one of the features of my new product. The dense vermiculite will keep the product from floating out when watered. The substance to be embodied in the cells will be well trapped because of the minute size of the cells and assure slow leaching over a long period of time. Also, the product will "stand up" under repeated watering and not become mushy, as lighter and larger cell vermiculites do. The exfoliated vermiculite is now ground to the desired granule size and it is ready for placing the desired substance or substances therein to obtain my new product.

The method of embodying the desired substance in the exfoliated vermiculite granules to obtain my new product is an important feature of my invention. It, of course, can be accomplished by immersing the vermiculite in a tank containing the desired substances to be embodied in a liquid form, but this method does not result in the best vermiculite product, and further it is a costly method because of the necessity for drying out the resulting product so it can be put in packages without damage thereto by wetting. The batch process also does not result in producing the best product desirable since the soaking tends to close up the cells or void structure of the granules and, therefore, less substance will be embodied in the granules than is otherwise possible.

In accordance with my invention I take the granules and apply heat thereto, which should be between 350 to 600 degrees F., with possibly the most satisfactory temperature being around 400 degrees F. This heated vermiculite is then moved into the top of a chamber where it will be caused to be scattered or dispersed and then fall by gravity downwardly through the chamber. The dispersing can be done by any suitable means. This falling vermiculite is then caused to come in contact with a fine mist which will contain the substance to be embodied in the vermiculite to produce my new vermiculite product which is beneficial for the growth of plants, either as a product for merely conditioning the soil, a product for both conditioning the soil and providing nutritional plant food to growing plants, a product which by itself will grow plants, or still further a product to help provide these plants with beneficial substances which can be insecticides not harmful to the plant when taken through its root system.

The fine mist may be fed into the chamber and brought into contact with the falling vermiculite in several different ways. One way which has been found to be satisfactory is the mixing of a solution carrying the substance with air and then forcing this substance out through a nozzle under a pressure such as 5 to 20 pounds per square inch to produce the desired fine mist. This mist is then directed upwardly into the continuous falling granules of vermiculite and as contact is made the vermiculite absorbs the liquid, together with the substance which is carried therein, such being water soluble plant fertilizing material, an organic material or any other desired material, either separately or combined. The step of having the vermiculite granules heated to considerable temperature when they come into contact with the liquid in the form of a fine mist is very important. By heating the granules the cells or voids are properly conditioned so that maximum liquid will be absorbed, yet there will not be an undesirable moisture content left in the granules. The heated granule, as it contacts the particles of liquid in the mist, has all of its cells or voids fully expanded and therefore it immediately absorbs the maximum amount of liquid and at the same time evaporates the water content of the liquid with the result that the substance in the liquid will become embodied in the vermiculite structure of the granule and will lose moisture content by evaporation resulting from the heat being given off from the granule.

When the granule is treated in this manner and then allowed to pass out of the treating chamber, it is in a condition which requires no further treatment and is ready for packaging and use. The moisture content of the resulting product will be less than 25 percent of the volume of the vermiculite and with this low a moisture content, no trouble is experienced in immediately packaging the product. It is not necessary to apply additional heat to the product so as to remove any moisture content. Tests have shown that when heat has to be applied after the vermiculite receives the liquid in order that the moisture content may be reduced properly, harm is done to the granule structure and it does not function in as efficient a manner as is desirable in allowing the substances placed therein to leach off into the soil or to give up such to the plant roots when water is applied thereto. Furthermore, the product can be caused to contain a maximum of the desired substance. Thus, better and longer benefits will result.

When the product of this invention is to be mixed with soil for fertilizing purposes, the amount of fertilizer incorporated therein may be greater than the amount incorporated when the product is to be used for the direct growth of plants. It is possible to place the product of this invention in a pot or container, plant seeds directly therein, and merely water. Plants have been grown in this manner, and the seeds and plants have developed at a completely satisfactory rate. Also, the product of this invention may be utilized in the same manner as the exfoliated vermiculite described in my aforesaid U. S. Patent No. 2,240,859, or in any other desired manner. As will be evident, when the product is either placed in the soil or utilized directly, and the soil or plant bed is watered, the nutritional elements of the fertilizers will tend to be leached out of the granules, to become available as plant food. The leaching of the fertilizer does not, of course, take place at once, but gradually and over a period of time depending upon the relative amount of product mixed with the soil and the amount of rainfall or watering. Because of the toughness and density of the vermiculite obtained by the special process of exfoliating, a large amount of any substance can be incorporated in the granules and leaching will be slow because the granule does not break down. Tests show that fertilizer is not exhausted until there has been as high as thirty waterings.

From the foregoing, it will be evident that my product and method of producing the same is new and beneficial. As will be evident, the product not only acts as a soil conditioner to aerate and retain a loose condition of the soil, but also may be utilized to introduce any desired nutritional element or other elements into the soil. The nutritional elements or fertilizer is well distributed throughout the granules and remains embodied in the granules during shipping, storage and handling, so that no remixing or further treatment at the point of use is necessary. The product is also sufficiently dry so it may be shipped in any suitable containers without having excess moisture weight. The preferred method of making the product not only insures uniformity of distribution of the fertilizer within the granules, but also may be carried out simply and inexpensively. The preparation of a solution of the water soluble fertilizer in water is generally merely a matter of weighing out the desired amounts of the fertilizers and then merely placing them in the water. The relative amount of fertilizer in the final product is quite readily varied, since the amount of fertilizer is easily varied when making up the initial soluton. The same is true of any other substance or material desired to be embodied in the vermiculite granules. The method of making is economical, can be carried out in a continuous manner and requires no costly drying equipment.

It will be understood that various embodiments of this invention may exist within the fundamental principles thereof and that various changes may be made therein, all without departing from the spirit and scope of this invention.

This application is a continuation-in-part of my co-pending application Serial No. 305,089 filed August 18, 1952 for "Plant Growth Soil Treating Product and Method of Producing the Same" (now abandoned).

What is claimed is:

1. A method of producing a vermiculite product which comprises producing exfoliated vermiculite granules, heating said granules to a temperature between 350 degrees to 600 degrees Fahrenheit and then while in such heated condition subjecting said granules to a fine mist formed by mixing air and a liquid which contains therein substances desired to be embodied in the cells of the exfoliated vermiculite granules.

2. The method of claim 1 in which the heated granules are dispersed at the top of a chamber and allowed to fall by gravity and the mist is caused to contact the granules during their downward movement.

3. The method of claim 1 in which the heated granules are allowed to fall through space under the action of gravity and the mist is caused by pressure to move upwardly through the granules during their falling.

4. The method of claim 1 in which the liquid is water and contained therein is a water soluble plant nutritional substance.

5. The method of claim 1 in which the substance in the liquid is an insecticide capable of being transmitted to a growing plant through its root system without harmful effects to the plant.

6. A method of producing a vermiculite soil conditioning product which comprises producing exfoliated vermiculite granules, heating said granules to a temperature between 350 degrees to 600 degrees Fahrenheit and then while in such heated condition subjecting said granules to a fine mist formed by mixing air and a liquid in which is contained an organic soil conditioning substance.

7. A method of producing a vermiculite product which comprises taking vermiculite ore and increasing its moisture content, exfoliating the vermiculite by dropping it in a heated chamber having a temperature near its bottom of around 2000 degrees F., grinding the exfoliated vermiculite to between a −4 to +20 mesh granule size, heating said granules to a temperature between 350 to 600 degrees Fahrenheit, and then while in a heated condition subjecting the granules to water containing a soluble substance that is desired to be placed in the granules.

8. The method of claim 7 in which the water and soluble substance is caused to become mixed with air and formed into a fine mist before contacting the granules.

References Cited in the file of this patent

UNITED STATES PATENTS

| | | |
|---|---|---|
| 1,972,390 | Miner | Sept. 4, 1934 |
| 2,030,239 | Byers | Feb. 11, 1936 |
| 2,341,800 | Martin et al. | Feb. 15, 1944 |
| 2,403,435 | Hammer | July 9, 1946 |
| 2,419,073 | Hammer | Apr. 15, 1947 |
| 2,669,510 | Dresser | Feb. 16, 1954 |